(12) United States Patent
Kumagai

(10) Patent No.: US 10,818,271 B2
(45) Date of Patent: Oct. 27, 2020

(54) PROJECTING APPARATUS AND PROJECTING METHOD

(71) Applicant: SEIKO EPSON CORPORATION, Tokyo (JP)

(72) Inventor: Takuya Kumagai, Matsumoto (JP)

(73) Assignee: SEIKO EPSON CORPORATION, Tokyo (JP)

(*) Notice: Subject to any disclaimer, the term of this patent is extended or adjusted under 35 U.S.C. 154(b) by 0 days.

(21) Appl. No.: 16/356,830

(22) Filed: Mar. 18, 2019

(65) Prior Publication Data

US 2019/0287491 A1 Sep. 19, 2019

(30) Foreign Application Priority Data

Mar. 19, 2018 (JP) .................... 2018-050646

(51) Int. Cl.
*G09G 5/377* (2006.01)
*G09G 5/373* (2006.01)

(52) U.S. Cl.
CPC ............ *G09G 5/377* (2013.01); *G09G 5/373* (2013.01); *G09G 2340/045* (2013.01); *G09G 2340/0464* (2013.01); *G09G 2340/12* (2013.01); *G09G 2354/00* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,629,721 A | * | 5/1997 | Kirk ..................... | G09G 1/28 345/629 |
| 6,621,524 B1 | * | 9/2003 | Iijima ................... | H04N 5/262 348/584 |
| 8,698,796 B2 | * | 4/2014 | Mochizuki ............. | G06T 15/04 345/419 |
| 2007/0030374 A1 | * | 2/2007 | Ishii ................... | H04N 5/23293 348/333.01 |

(Continued)

FOREIGN PATENT DOCUMENTS

| | | |
|---|---|---|
| JP | H10-191215 A | 7/1998 |
| JP | 2004-94345 A | 3/2004 |

(Continued)

*Primary Examiner* — Motilewa Good Johnson
(74) *Attorney, Agent, or Firm* — Oliff PLC

(57) ABSTRACT

A projecting apparatus includes an image generating section configured to generate a masking-processed image by combining an input image and a mask drawing image including a mask region and a non-mask region and a projecting section configured to project the masking-processed image. The image generating section is at least capable of executing, on a first masking-processed image including a non-mask image corresponding to the non-mask region in a first projecting position, moving masking processing for generating a second masking-processed image obtained by moving the non-mask image from the first projecting position to a second projecting position or capable of executing, on a first masking-processed image including the non-mask image having a first dimension, enlarging or reducing masking processing for generating a second masking-processed image obtained by enlarging or reducing the non-mask image from the first dimension to a second dimension.

20 Claims, 12 Drawing Sheets

(56) References Cited

U.S. PATENT DOCUMENTS

| | | | | |
|---|---|---|---|---|
| 2013/0155069 A1* | 6/2013 | Borders | ................. | G06T 11/60 |
| | | | | 345/441 |
| 2014/0267117 A1* | 9/2014 | Moll | ...................... | G06T 13/80 |
| | | | | 345/173 |
| 2015/0098648 A1* | 4/2015 | Ishii | ......................... | G06T 7/11 |
| | | | | 382/164 |
| 2015/0138188 A1* | 5/2015 | Gillard | .................. | G09G 5/377 |
| | | | | 345/419 |
| 2018/0343426 A1* | 11/2018 | Wada | .................. | H04N 1/3871 |

FOREIGN PATENT DOCUMENTS

| | | | |
|---|---|---|---|
| JP | 2005269459 A | * | 9/2005 |
| JP | 2013-178368 A | | 9/2013 |
| JP | 2016-39587 A | | 3/2016 |
| WO | 98/30021 A1 | | 7/1998 |

* cited by examiner

PROJECTING APPARATUS AND PROJECTING METHOD

CROSS-REFERENCE

The entire disclosure of Japanese Patent Application No. 2018-050646, filed Mar. 19, 2018 is expressly incorporated by reference herein.

BACKGROUND

1. Technical Field

The present invention relates to a projecting apparatus and a projecting method.

2. Related Art

An image processing apparatus performs image processing for combining a display image based on an imaging signal (an input signal) and a mask image including a transmission region and a non-transmission region and generates an image signal. The image processing apparatus outputs the image signal to a projector (a projection-type display apparatus). In the generated image signal, a portion corresponding to the transmission region of the mask image is output while keeping an original luminance value thereof. A luminance value of a portion corresponding to the non-transmission region is "0". That is, in an image based on the generated image signal, an original display image (hereinafter referred to as "non-mask display image") is displayed in a portion corresponding to the transmission region of the mask image. The original display image is not displayed and is masked in a portion corresponding to the non-transmission region of the mask image (e.g., JP-A-2016-39587 (Patent Literature 1)).

However, when the position and the size of the transmission region of the mask image are changed in order to change the position and the size of the non-mask display image, content of the non-mask display image changes.

SUMMARY

An advantage of some aspects of the invention is to solve the problem and the invention can be realized as the following aspects.

(1) According to an aspect of the invention, a projecting apparatus is provided. The projecting apparatus includes: an image generating section configured to generate a masking-processed image by combining an input image and a mask drawing image including a mask region for masking the input image and a non-mask region for not masking the input image; and a projecting section configured to project the masking-processed image. The image generating section is at least capable of executing, on a first masking-processed image including a non-mask image corresponding to the non-mask region in a first projecting position, moving masking processing for generating a second masking-processed image obtained by moving the non-mask image from the first projecting position to a second projecting position or capable of executing, on a first masking-processed image including the non-mask image having a first dimension, enlarging or reducing masking processing for generating a second masking-processed image obtained by enlarging or reducing the non-mask image from the first dimension to a second dimension.

According to the projecting apparatus according to this aspect, when it is desired to change the position and the dimension of the non-mask image, the non-mask image is moved or enlarged or reduced. Therefore, it is possible to prevent the position and the dimension of the non-mask region from being changed to change content of the non-mask image.

(2) In the projecting apparatus according to the aspect, when executing the moving masking processing, the image generating section may move the non-mask region in the mask drawing image from the first projecting position to the second projecting position, cut out the non-mask image in the first projecting position from the input image and move the non-mask image to the second projecting position, and thereafter combine the non-mask image and the mask drawing image to thereby generate the second masking-processed image.

According to the projecting apparatus according to the aspect with this configuration, the non-mask region in the mask drawing image is moved and the non-mask image is cut out from the input image and moved in synchronization with the non-mask region. Therefore, it is possible to prevent the position of the non-mask region from being changed to change the content of the non-mask image.

(3) In the projecting apparatus according to the aspect, when executing the moving masking processing, the image generating section may move the non-mask region in the mask drawing image from the first projecting position to the second projecting position, cut out, from the input image, a trimming image including the non-mask image in the first projecting position, and move the trimming image to move the non-mask image to the second projecting position, and thereafter combine the trimming image and the mask drawing image to thereby generate the second masking-processed image.

According to the projecting apparatus according to the aspect with this configuration, the non-mask region in the mask drawing image is moved and the trimming image including the non-mask image is cut out from the input image and moved in synchronization with the non-mask region. Therefore, it is possible to prevent the position of the non-mask region from being changed to change the content of the non-mask image.

(4) In the projecting apparatus according to the aspect, when executing the enlarging or reducing masking processing, the image generating section may enlarge or reduce the non-mask region in the mask drawing image from the first dimension to the second dimension, cut out the non-mask image having the first dimension from the input image, enlarge or reduce the non-mask image at a same enlargement ratio or a same reduction ratio as an enlargement ratio or a reduction ratio of the non-mask region, and thereafter combine the non-mask image and the mask drawing image to thereby generate the second masking-processed image.

According to the projecting apparatus according to the aspect with this configuration, the non-mask region in the mask drawing image is enlarged for reduced and the non-mask image is cut out from the input image and enlarged or reduced in synchronization with the non-mask region. Therefore, it is possible to prevent the dimension of the non-mask region from being changed to change the content of the non-mask image.

(5) In the projecting apparatus according to the aspect, when executing the enlarging or reducing masking processing, the image generating section may enlarge or reduce the non-mask region in the mask drawing image from the first dimension to the second dimension, cut out, from the input image, a trimming image including the non-mask image having the first dimension, enlarge or reduce the trimming image at a same enlargement ratio or a same reduction ratio as an enlargement ratio or a reduction ratio of the non-mask region, and thereafter combine the trimming image and the mask drawing image to thereby generate the second masking-processed image.

According to the projecting apparatus according to the aspect with this configuration, the non-mask region in the mask drawing image is enlarged or reduced and the trimming image including the non-mask image is cut out from the input image and enlarged or reduced in synchronization with the non-mask region. Therefore, it is possible to prevent the dimension of the non-mask region from being changed to change the content of the non-mask image.

(6) In the projecting apparatus according to the aspect, when executing the moving masking processing, the image generating section may cut out the non-mask image from the first masking-processed image including the non-mask image in the first projecting position, move the non-mask image to the second projecting position, and thereafter execute background processing on a portion other than the non-mask image of the first masking-processed image to thereby generate the second masking-processed image.

According to the projecting apparatus according to the aspect with this configuration, the non-mask image is cut out from the first masking-processed image. Therefore, it is possible to prevent the position of the non-mask region from being changed to change the content of the non-mask image.

(7) In the projecting apparatus according to the aspect, when executing the moving masking processing, the image generating section may cut out a trimming image including the non-mask image from the first masking-processed image including the non-mask image in the first projecting position, move the trimming image to move the non-mask image to the second projecting position, and thereafter execute background processing on a portion other than the non-mask image of the first masking-processed image to thereby generate the second masking-processed image.

According to the projecting apparatus according to the aspect with this configuration, the trimming image including the non-mask image is cut out from the first masking-processed image. Therefore, it is possible to prevent the position of the non-mask region from being changed to change the content of the non-mask image.

(8) In the projecting apparatus according to the aspect, when executing the enlarging or reducing masking processing, the image generating section may cut out the non-mask image from the first masking-processed image including the non-mask image having the first dimension, enlarge or reduce the non-mask image to the second dimension, and thereafter execute background processing on a portion other than the non-mask image of the first masking-processed image to thereby generate the second masking-processed image.

According to the projecting apparatus according to the aspect with this configuration, the non-mask image is cut out from the first masking-processed image. Therefore, it is possible to prevent the dimension of the non-mask region from being changed to change the content of the non-mask image.

(9) In the projecting apparatus according to the aspect, when executing the enlarging or reducing masking processing, the image generating section may cut out a trimming image including the non-mask image from the first masking-processed image including the non-mask image having the first dimension, enlarge or reduce the trimming image to change the non-mask image to the second dimension, and thereafter execute background processing on a portion other than the non-mask image of the first masking-processed image to thereby generate the second masking-processed image.

According to the projecting apparatus according to the aspect with this configuration, the trimming image including the non-mask image is cut out from the first masking-processed image. Therefore, it is possible to prevent the dimension of the non-mask region from being changed to change the content of the non-mask image.

(10) In the projecting apparatus according to the aspect, the position and the dimension of the non-mask image may be able to be set according to a setting menu projected by the projecting section, and it may be possible to set according to the setting menu whether the moving masking processing and the enlarging or reducing masking processing are executed.

According to the projecting apparatus according to the aspect with this configuration, it is possible to set the position and the dimension of the non-mask image and possibility of the execution of the moving masking processing and the enlarging or reducing masking processing.

The invention can be realized in various forms other than the aspects explained above. For example, the invention can be realized in a form of a projecting method.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Figure 1:
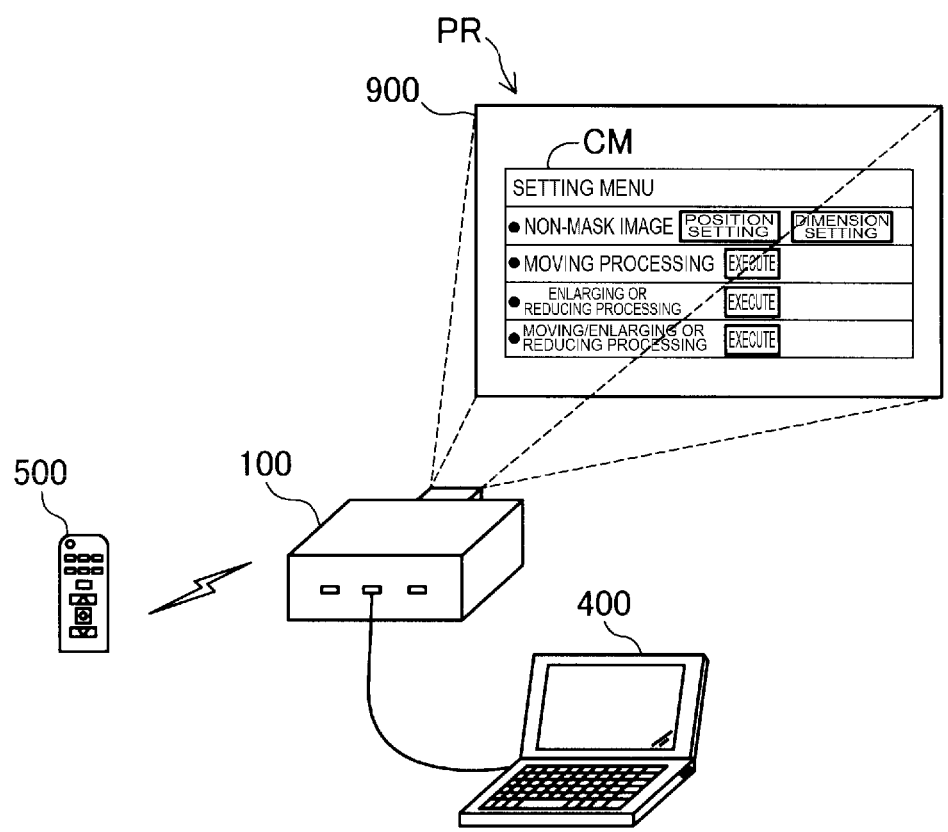
FIG. 1 is an exterior view of a projecting apparatus in a first embodiment.

FIG. 1 is a diagram showing the exterior of a projecting apparatus 100 in a first embodiment of the invention. A personal computer (PC) 400 is connected to the projecting apparatus 100. The projecting apparatus 100 projects an image based on an image signal input from the PC 400, that is, an input image onto a screen 900. A projection range PR of the projecting apparatus 100 is equal to the area of the screen 900. The projecting apparatus 100 executes, according to an instruction of a user, normal masking processing for masking a portion other than a portion that the user desires to show in the input image, that is, a non-mask image. On the other hand, the projecting apparatus 100 is capable of executing at least one of moving masking processing for moving the non-mask image to a position instructed by the user and enlarging or reducing masking processing for enlarging or reducing the non-mask image to a dimension instructed by the user.

A remote controller 500 is a device for remotely operating the projecting apparatus 100. The user gives an instruction to the projecting apparatus 100 via the remote controller 500 to thereby cause the projecting apparatus 100 to execute the normal masking processing, the moving masking processing, and the enlarging or reducing masking processing. For example, the user is capable of causing, using the remote controller 500, the projecting apparatus 100 to project a setting menu CM onto the screen 900, setting a position and a dimension of the non-mask image in the setting menu CM, and setting whether the moving masking processing and the enlarging or reducing masking processing are executed. The setting menu CM may be provided in a main body of the projecting apparatus 100 as a setting panel.

Figure 2:
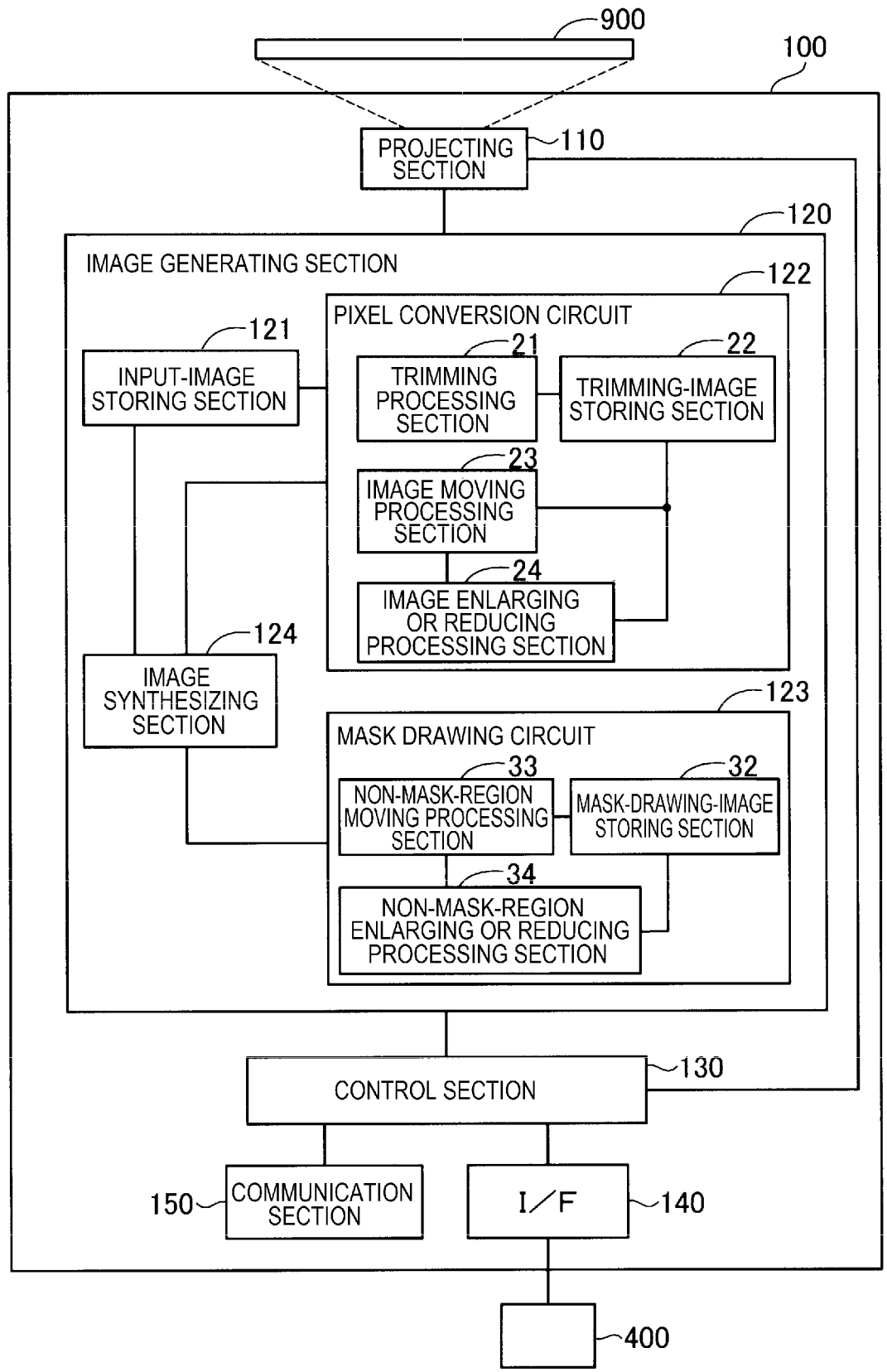
FIG. 2 is a block diagram showing the configuration of the projecting apparatus in the first embodiment.

FIG. 2 is a block diagram showing the configuration of the projecting apparatus 100 in the first embodiment. The projecting apparatus 100 includes a projecting section 110, an image generating section 120, a control section 130, an external interface (I/F) 140, and a communication section 150.

The I/F 140 is connected to the PC 400. The I/F 140 receives an image signal input from the PC 400 and outputs the image signal to the control section 130. The I/F 140 outputs a control signal received from the control section 130 to the PC 400.

The communication section 150 performs wireless communication between the communication section 150 and the remote controller 500 (FIG. 1). The communication section 150 receives an instruction signal input by the user via the remote controller 500 and outputs the instruction signal to the control section 130.

The control section 130 is configured by, for example, a microcomputer. The control section 130 controls the operation of the entire projecting apparatus 100. The control section 130 outputs the image signal output from the I/F 140 to the image generating section 120. The control section 130 causes, according to the instruction signal of the user output from the communication section 150, the image generating section 120 to execute the respective kinds of masking processing. The control section 130 causes the image generating section 120 to output an image signal of a masking-processed image generated by the image generating section 120 to the projecting section 110 and causes the projecting section 110 to project image light based on the image signal.

The image generating section 120 is a circuit that generates a masking-processed image. The image generating section 120 includes an input-image storing section 121, a pixel conversion circuit 122, a mask drawing circuit 123, and an image synthesizing section 124. As the input-image storing section 121, a memory such as a RAM (random access memory) can be used. The input-image storing section 121 stores, according to control by the control section 130, an input image based on the image signal output from the control section 130.

The pixel conversion circuit 122 includes a trimming processing section 21, a trimming-image storing section 22, an image moving processing section 23, and an image enlarging or reducing processing section 24. The trimming processing section 21 reads the input image from the input-image storing section 121 and cuts out an image. As the trimming-image storing section 22, a memory such as a RAM (random access memory) can be used. The trimming-image storing section 22 stores a trimming image cut out by the trimming processing section 21. The image moving processing section 23 reads the trimming image from the trimming-image storing section 22 and moves the trimming image. The image enlarging or reducing processing section 24 reads the trimming image from the trimming-image storing section 22 and enlarges or reduces the trimming image. The image enlarging or reducing processing section 24 enlarges or reduces the trimming image moved by the image moving processing section 23. The operations in the pixel conversion circuit 122 are executed according to the control by the control section 130.

The mask drawing circuit 123 includes a mask-drawing-image storing section 32, a non-mask-region moving processing section 33, and a non-mask-region enlarging or reducing processing section 34. As the mask-drawing-image storing section 32, a memory such as a RAM (random access memory) can be used. A mask drawing image is stored in advance in the mask-drawing-image storing section 32. The mask drawing image is an image for masking an input image and includes a mask region and a non-mask region. Details of the mask drawing image are explained below. The non-mask-region moving processing section 33 reads the mask drawing image from the mask-drawing-image storing section 32 and moves the non-mask region. The non-mask-region enlarging or reducing processing section 34 reads the mask drawing image from the mask-drawing-image storing section 32 and enlarges or reduces the non-mask region. The non-mask-region enlarging or reducing processing section 34 enlarges or reduces the non-mask region moved by the non-mask-region moving processing section 33. The mask drawing circuit 123 may acquire a mask drawing image from an external device instead of storing the mask drawing image in advance. The operations in the mask drawing circuit 123 are executed according to the control by the control section 130.

The image synthesizing section 124 combines the input image and the mask drawing image and generates a masking-processed image according to the control by the control section 130. In an example in the first embodiment, the image synthesizing section 124 combines the input image acquired from the input-image storing section 121 and the mask drawing image acquired from the mask drawing circuit 123. The image synthesizing section 124 combines the trimming image acquired from the pixel conversion circuit 122 and the mask drawing image acquired from the mask drawing circuit 123.

The projecting section 110 projects the masking-processed image generated by the image generating section 120 onto the screen 900 according to the control by the control section 130. The projecting section 110 is configured by an illumination optical system, a color separation optical system, three liquid-crystal panel sections of a transmission type functioning as light modulating sections respectively corresponding to the three primary colors (red (R), green (G), and blue (B)) of light, a dichroic prism, and a projection optical system. White light emitted by the illumination optical system is separated into three color lights of red, green, and blue by a color light separation optical system. The separated three color lights are guided to the liquid-crystal panel sections by the color light separation optical system and modulated into image lights representing an image. The dichroic prism combines the modulated three image lights. The projection optical system projects the combined image lights onto the screen 900. As a projection display scheme of the projecting section 110, a DLP (registered trademark) scheme may be used instead of the liquid crystal scheme explained above.

Figure 3:
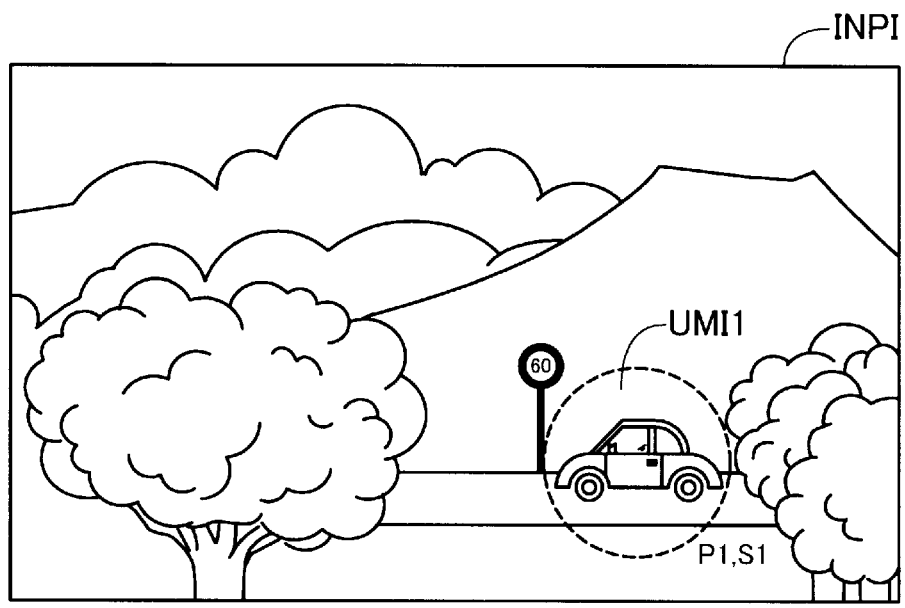
FIG. 3 is a diagram showing an input image.

FIG. 3 is a diagram showing an example of an input image INPI projected by the projecting section 110 (FIG. 2). The input image INPI is a rectangular image coinciding with the projection range PR (FIG. 1) of the projecting apparatus 100. In the input image INPI, a circular portion surrounded by a broken line is a non-mask image UMI1 determined by the user. Coordinate values of pixels in the non-mask image UMI1 region are indicated by coordinates ($x_n$, $y_n$). The number of pixels in the non-mask image UMI1 region is indicated by the number of pixels N1. For convenience of explanation, the position of the non-mask image UMI1 is referred to as first projecting position P1. The dimension of the non-mask image UMI1 is referred to as first dimension S1. The input image INPI is stored in the input-image storing section 121 (FIG. 2).

Figure 4:
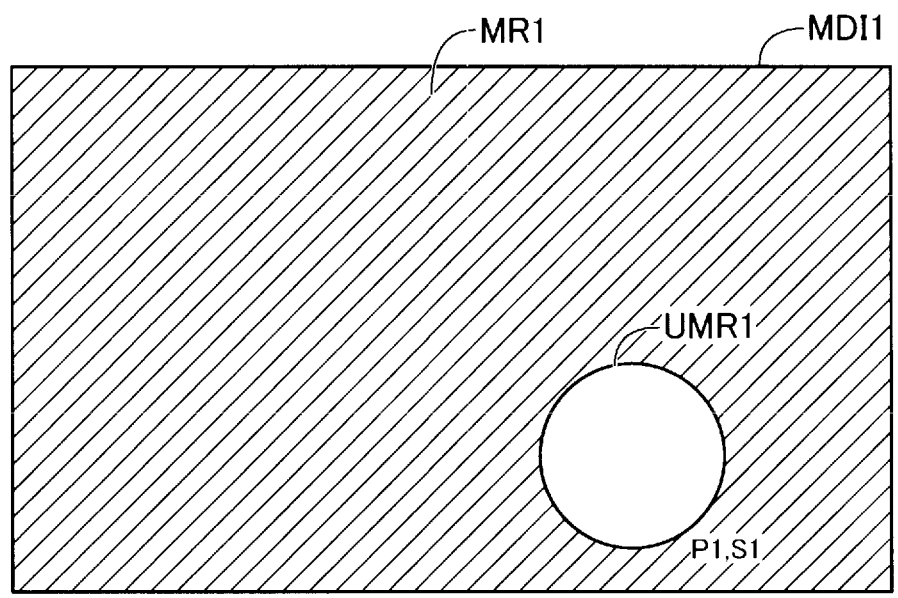
FIG. 4 is a diagram showing a mask drawing image.

FIG. 4 is a diagram showing an example of a mask drawing image MDI1 stored in the mask-drawing-image storing section 32 of the mask drawing circuit 123 (FIG. 2). The mask drawing image MDI1 is a rectangular image having the same dimension as the dimension of the input image INPI (FIG. 3). The mask drawing image MDI1 includes a mask region MR1 that masks the input image INPI and a non-mask region UMR1 that does not mask the input image INPI. Pixels of the mask drawing image MDI1 include, for example, an RGB channel and include an alpha channel. In the mask drawing image MDI1, the transmittance in the mask region MR1 is set to 0% and the transmittance in the non-mask region UMR1 is set to 100%. The position and the dimension of the non-mask region UMR1 respectively correspond to the position and the dimension of the non-mask image UMI1 of the input image INPI. That is, coordinate values of pixels in the non-mask region UMR1 are indicated by coordinates ($x_n$, $y_n$). The number of pixels in the non-mask region UMR1 is indicated by the number of pixels N1. The position of the non-mask region UMR1 is the first projecting position P1. The dimension of the non-mask region UMR1 is the first dimension S1. The mask drawing image MDI1 may include a non-mask region having another shape. In this case, the mask drawing circuit 123 may adjust the non-mask region with a not-shown non-mask-region adjusting section according to the non-mask image UMI1.

Figure 5:
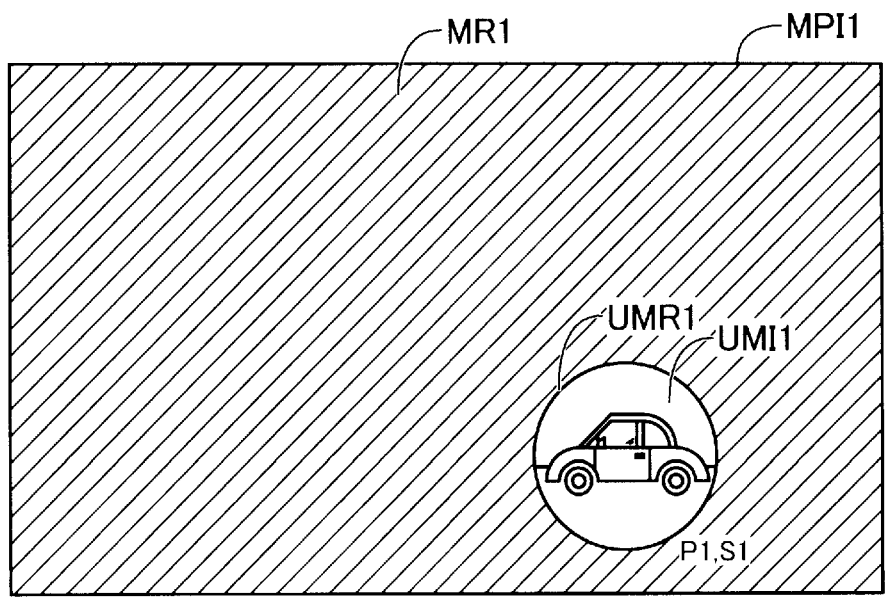
FIG. 5 is a diagram showing first masking-processed image.

FIG. 5 is a diagram showing a first masking-processed image MPI1 synthesized by the image synthesizing section 124. The first masking-processed image MPI1 is generated by superimposing the input image INPI shown in FIG. 3 and the mask drawing image MDI1 shown in FIG. 4, that is, by the normal masking processing. In the non-mask region UMR1, a luminance value indicated by an image signal of the input image INPI (the non-mask image UMI1) is directly output. In the mask region MR1, the luminance value indicated by the image signal of the input image INPI is "0". As a result, a portion other than the non-mask image UMI1 of the input image INPI is masked. The first masking-processed image MPI1 is generated.

FIGS. 6 to 9 are diagrams showing states in which, in the first embodiment, the image generating section 120 (FIG. 2) executes, on the first masking-processed image MPI1 (FIG. 5), moving masking processing for moving the non-mask image UMI1 from the first projecting position P1 to a second projecting position P2 instructed by the user and enlarging masking processing for enlarging the non-mask image UMI1 from the first dimension S1 to a second dimension S2 instructed by the user. The second dimension S2 is Q times (Q is a value larger than 1) the first dimension S1.

Figure 6:
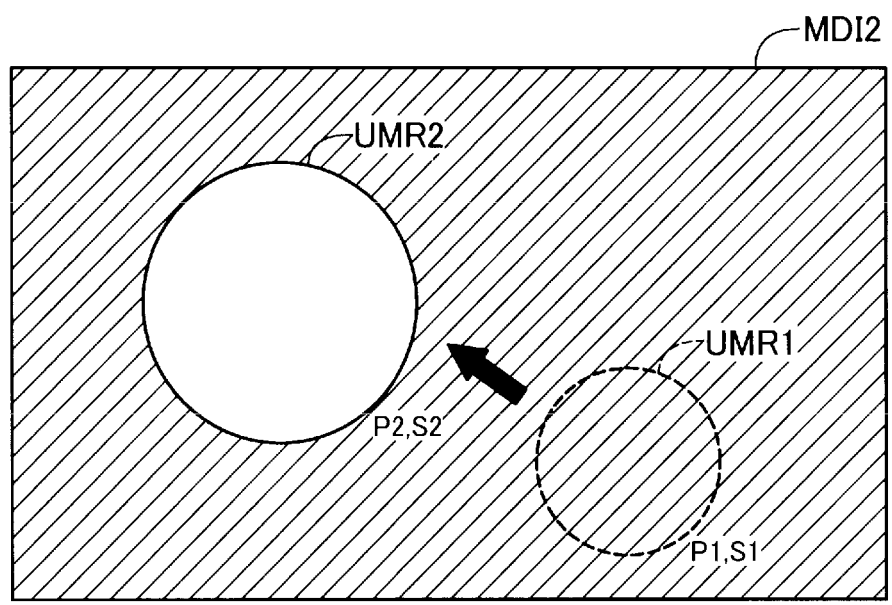
FIG. 6 is a diagram showing a state in which anon-mask region is moved and enlarged.

FIG. 6 is a diagram showing a state in which the mask drawing circuit 123 (FIG. 2) moves and enlarges the non-mask region UMR1 in the mask drawing image MDI1 (FIG. 4). The non-mask region UMR1 is moved from the first projecting position P1 to the second projecting position P2 and enlarged from the first dimension S1 to the second dimension S2 to be a non-mask region UMR2. Coordinate values of pixels in the non-mask region UMR2 are indicated by coordinates ($X_n$, $Y_n$). The number of pixels in the non-mask region UMR2 is Q times the number of pixels N1. In the movement and the enlargement of the non-mask region UMR1, pixel values (e.g., values of R, G, and B) of the pixels, the coordinate values of which in the mask drawing image MDI1 are the coordinates ($X_n$, $Y_n$), are converted into pixel values of pixels after the number of pixels in the non-mask region UMR1 is multiplied by Q and the pixel values are interpolated. As a result, a mask drawing image MDI2 including the non-mask region UMR2 is obtained.

Figure 7:
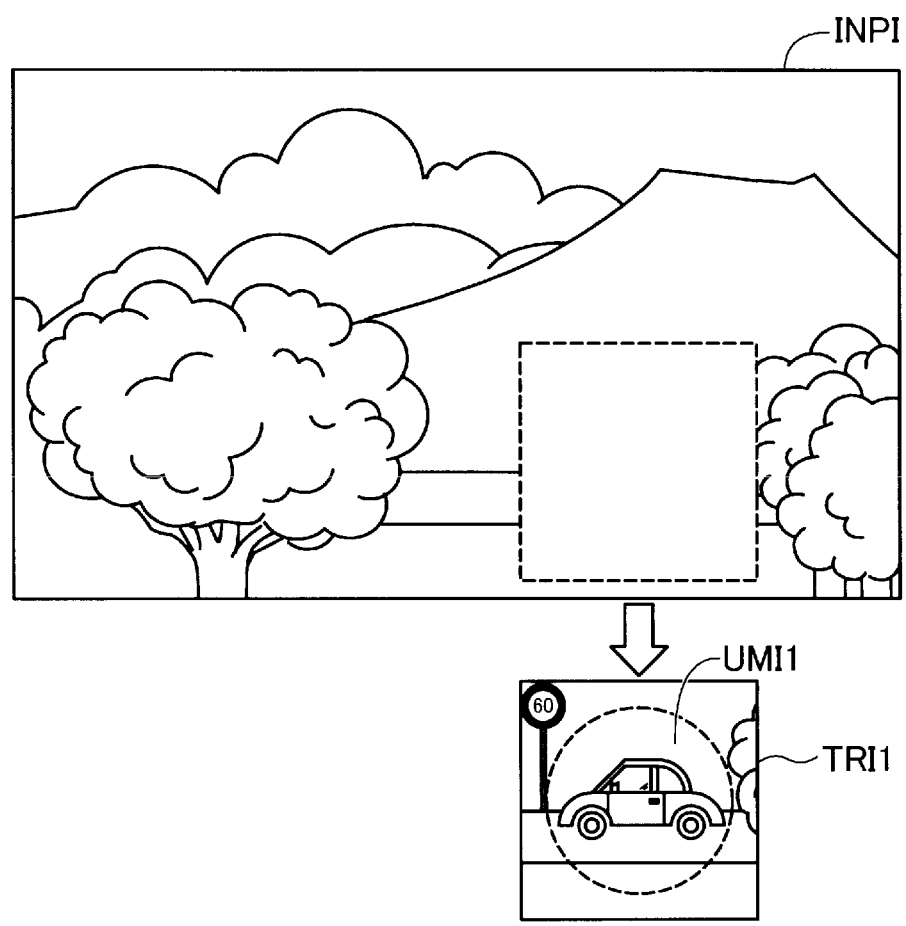
FIG. 7 is a diagram showing a state in which a trimming image is cut out.

FIG. 7 is a diagram showing a state in which the pixel conversion circuit 122 (FIG. 2) cuts out a trimming image TRI1 including the non-mask image UMI1 from the input image INPI. The trimming image TRI1 is a square image, the center of which coincides with the center of the non-mask image UMI1, larger than the non-mask image UMI1. Only a circular non-mask image UMI1 may be cut out as the trimming image. However, if the square trimming image TRI1 is cut out, even if positional deviation occurs a little in movement of the trimming image TRI1 explained below, influence on a trimming image to be generated is small. Coordinate values of pixels in the non-mask image UMI1 region included in the trimming image TRI1 are indicated by coordinates ($x_n$, $y_n$). The number of pixels in the trimming image TRI1 region is indicated by the number of pixels M1.

Figure 8:
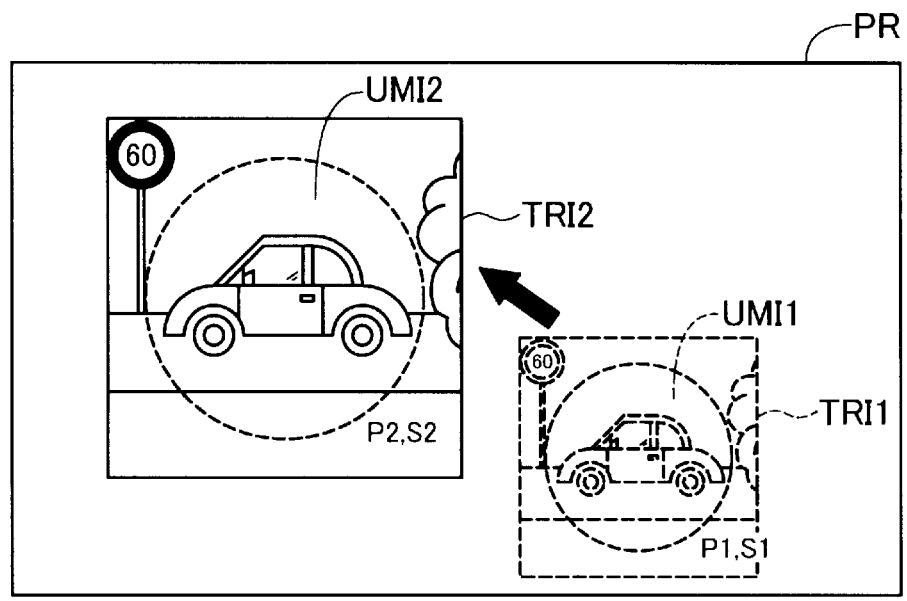
FIG. 8 is a diagram showing a state in which the trimming image is moved and enlarged.

FIG. 8 is a diagram showing a state in which the pixel conversion circuit 122 (FIG. 2) moves and enlarges the trimming image TRI1 in the projection range PR. In the movement and the enlargement of the trimming image TRI1, the number of pixels of the trimming image TRI1 is increased to Q times the number of pixels M1. The pixel values of the pixels are interpolated. That is, the non-mask image UMI1 included in the trimming image TRI1 is enlarged at the same enlargement ratio as an enlargement ratio of the non-mask region UMR1 (FIG. 6). At the same time, the coordinate values of the pixels of the trimming image TRI1 are changed to set the coordinates ($X_n$, $Y_n$) of the coordinate values of the pixels in the non-mask image UMI1 region included in the trimming image TRI1 to the coordinates ($X_n$, $Y_n$) (the coordinates of the pixels in the non-mask region UMR2 (FIG. 6)). As a result, a trimming image TRI2 including a non-mask image UMI2 having the second dimension S2 located in the second projecting position P2 is obtained.

Figure 9:
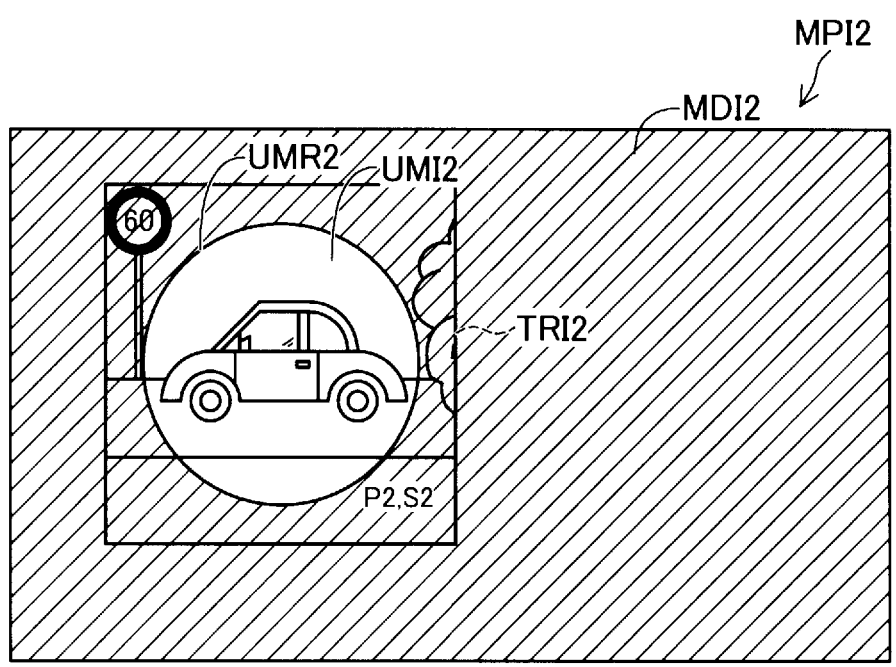
FIG. 9 is a diagram showing second masking-processed image.

FIG. 9 is a diagram showing a state in which the image synthesizing section 124 (FIG. 2) combines the trimming image TRI2 and the mask drawing image MDI2. For convenience of illustration, a portion of the trimming image TRI2 masked by the mask drawing image MDI2 is also drawn. The trimming image TRI2 and the mask drawing image MDI2 are combined with the non-mask image UMI2 and the non-mask region UMR2 associated with each other. As a result, a second masking-processed image MPI2 including the non-mask image UMI2 having the second dimension S2 in the second projecting position P2 is generated. When the non-mask image UMI1 is cut out as a trimming image, the moved and enlarged non-mask image UMI2 is combined with the mask drawing image MDI2.

Figure 10:
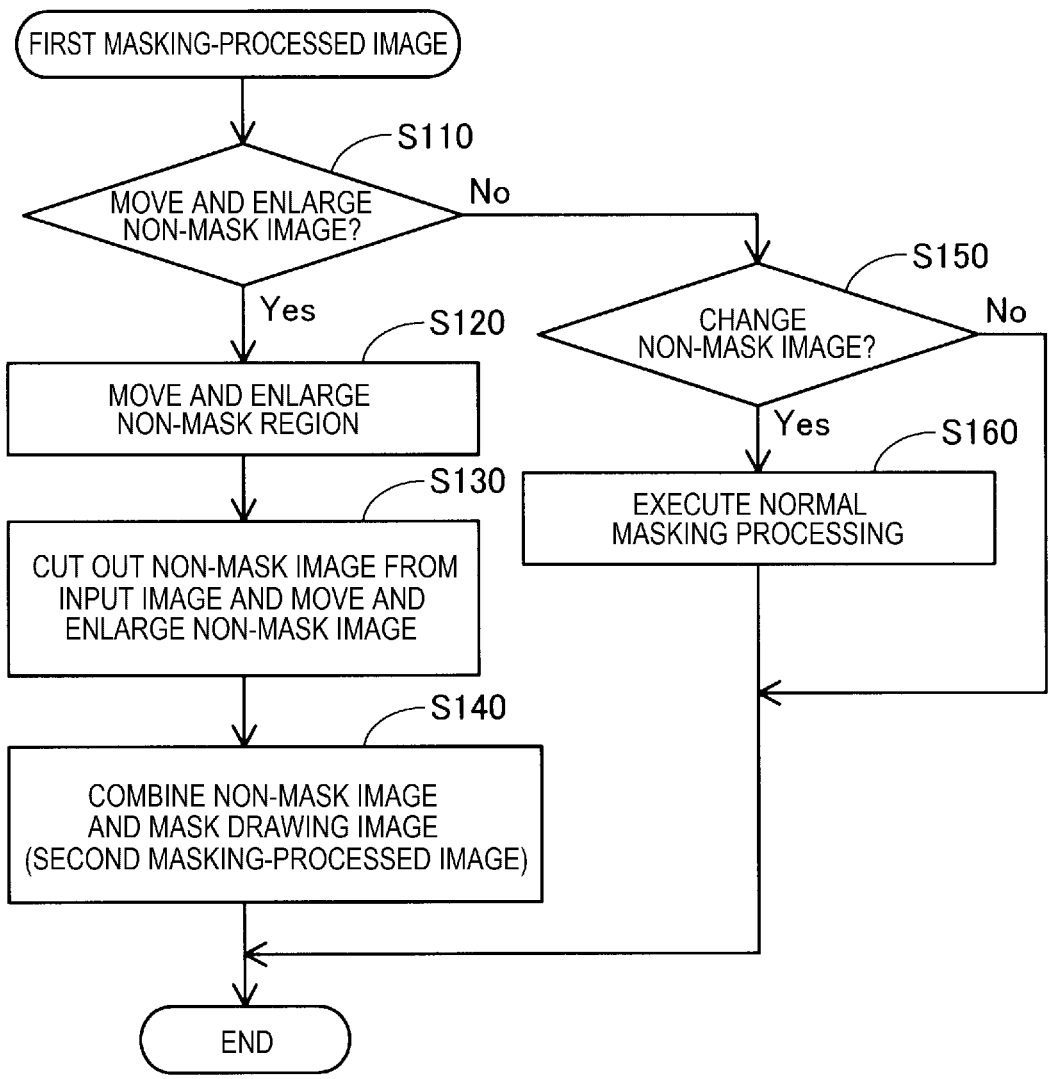
FIG. 10 is an example of a flowchart showing details of a masking processing process.

FIG. 10 is an example of a flowchart showing details of a masking processing process for the first masking-processed image MPI1 (FIG. 5) in the first embodiment. In step S110, the control section 130 (FIG. 2) determines whether to move and enlarge the non-mask image UMI1 according to an instruction of the user. When determining to move and enlarge the non-mask image UMI1 (Yes in step S110), the control section 130 shifts to step S120. In step S120, the image generating section 120 (FIG. 2) moves the non-mask region UMR1 in the mask drawing image MDI1 from the first projecting position P1 to the second projecting position P2 and enlarges the non-mask region UMR1 from the first dimension S1 to the second dimension S2 to obtain the mask drawing image MDI2 according to the control by the control section 130 (FIG. 6). In step S130, the image generating section 120 cuts out the trimming image TRI1 including the non-mask image UMI1 from the input image INPI, moves the trimming image TRI1 to move the non-mask image UMI1 from the first projecting position P1 to the second projecting position P2, and enlarges the trimming image TRI1 at the same enlargement ratio as an enlargement ratio of the non-mask region UMR1 to obtain the trimming image TRI2 including the non-mask image UMI2 according to the control by the control section 130 (FIGS. 7 and 8). In step S140, the image generating section 120 combines the trimming image TRI2 including the non-mask image UMI2 and the mask drawing image MDI2 to obtain the second masking-processed image MPI2 according to the control by the control section 130 (FIG. 9). Thereafter, the masking processing process for the first masking-processed image MPI1 ends.

When determining in step S110 not to move and enlarge the non-mask image UMI1 (No in step S110), the control section 130 shifts to step S150. In step S150, the control section 130 determines whether to change the non-mask image UMI1 according to an instruction of the user. When determining to change the non-mask image UMI1 (Yes in step S150), the control section 130 shifts to step S160. In step S160, the image generating section 120 executes the normal masking processing on the first masking-processed image MPI1 according to the control by the control section 130. That is, the image generating section 120 changes the position and the dimension of the non-mask region UMR1 in the mask drawing image MDI1 according to a non-mask image changed by the user and thereafter combines the mask drawing image MDI1 and the input image INPI. Thereafter, the masking processing process for the first masking-processed image MPI1 ends. On the other hand, in step S150, when determining not to change the non-mask image UMI1 (No in step S150), the masking processing process for the first masking-processed image MPI1 ends.

In the first embodiment, the moving masking processing for moving the non-mask image UMI1 from the first projecting position P1 to the second projecting position P2 and the enlarging masking processing for enlarging the non-mask image UMI1 from the first dimension S1 to the second dimension S2 are executed on the first masking-processed image MPI1. Instead of this, only the moving masking processing for moving the non-mask image UMI1 from the first projecting position P1 to the second projecting position P2 or the enlarging masking processing for enlarging the non-mask image UMI1 from the first dimension S1 to the second dimension S2 may be executed. Reducing masking processing for reducing the non-mask image UMI1 may be executed.

As explained above, in the first embodiment, in order to generate the second masking-processed image MPI2, the image generating section 120 moves the non-mask region UMR1 in the mask drawing image MDI1 from the first projecting position P1 to the second projecting position P2 and enlarges the non-mask region UMR1 from the first dimension S1 to the second dimension S2 to obtain the mask drawing image MDI2. At the same time, the image generating section 120 cuts out the trimming image TRI1 including the non-mask image UMI1 from the input image INPI and moves and enlarges the trimming image TRI1 to move the non-mask image UMI1 from the first projecting position P1 to the second projecting position P2 and enlarge the non-mask image UMI1 from the first dimension S1 to the second dimension S2 to obtain the trimming image TRI2. Thereafter, the image generating section 120 combines the mask drawing image MDI2 and the trimming image TRI2. Consequently, it is possible to prevent the position and the dimension of the non-mask region UMR1 from being changed to change content of the non-mask image UMI1.

Second Embodiment

Figure 11:
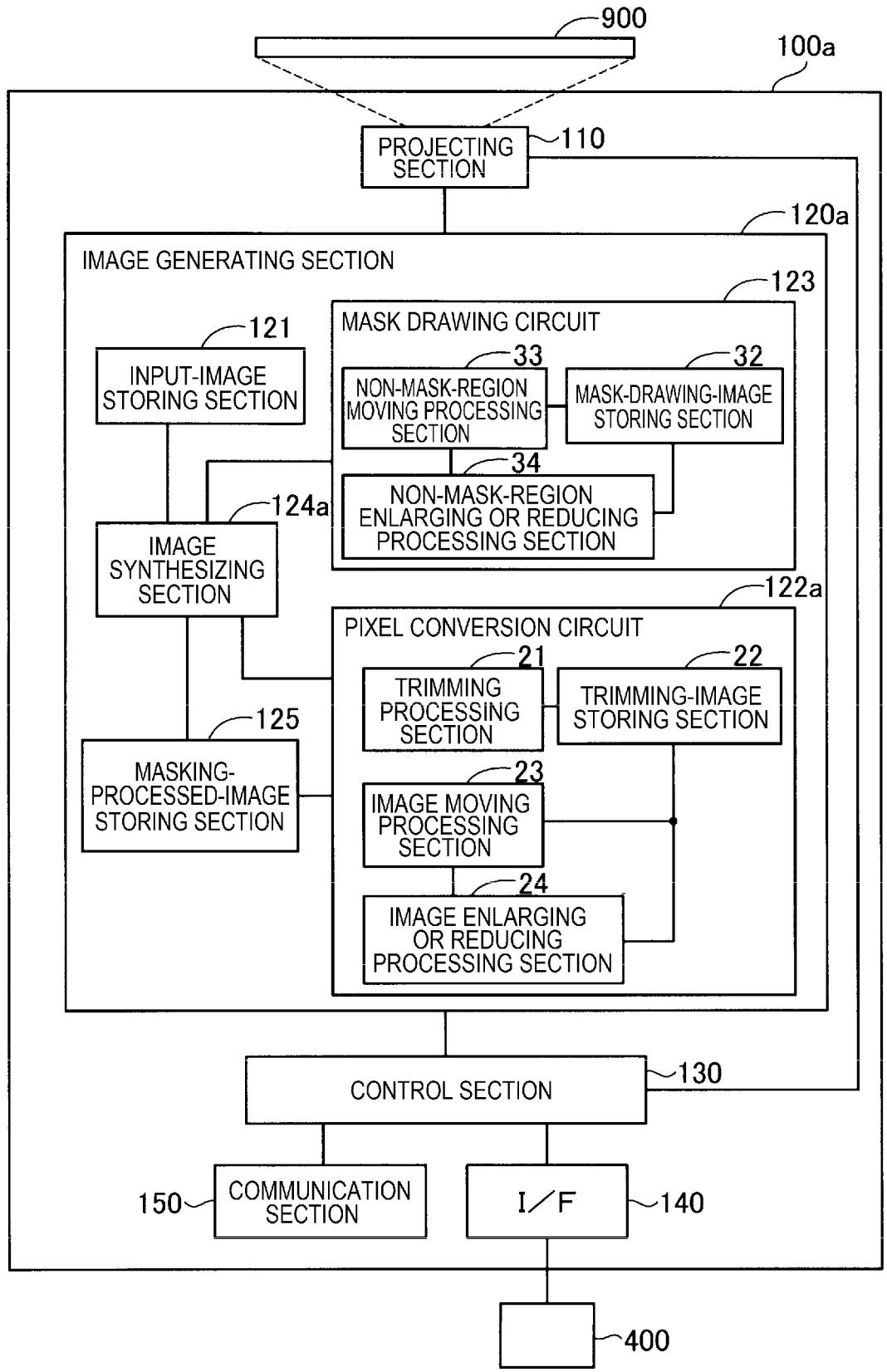
FIG. 11 is a block diagram showing the configuration of a projecting apparatus in a second embodiment.

FIG. 11 is a block diagram showing the configuration of a projecting apparatus 100a in a second embodiment and is a diagram corresponding to FIG. 5. Compared with the first embodiment shown in FIG. 5, a masking-processed-image storing section 125 is added to an image generating section 120a of the projecting apparatus 100a. The other components are substantially the same.

As the masking-processed-image storing section 125, a memory such as a RAM (random access memory) can be used. The masking-processed-image storing section 125 stores, according to control by the control section 130, a masking-processed image based on an image signal output from an image synthesizing section 124a. A pixel conversion circuit 122a reads the masking-processed image from the masking-processed-image storing section 125, cuts out an image, and executes movement and enlargement or reduction of a cut-out trimming image. Further, the image synthesizing section 124a combines the trimming image acquired from the pixel conversion circuit 122a and the masking-processed image acquired from the masking-processed-image storing section 125. The image synthesizing section 124a has a function of background processing.

FIGS. 12, 13, 14, and 15 are diagrams showing a state in which, in the second embodiment, the image generating section 120a (FIG. 11) executes, on the first masking-processed image MPI1 (FIG. 5), moving masking processing for moving the non-mask image UMI1 from the first projecting position P1 to the second projecting position P2 instructed by a user and enlarging masking processing for enlarging the non-mask image UMI1 from the first dimension S1 to the second dimension S2 instructed by the user.

Figure 12:
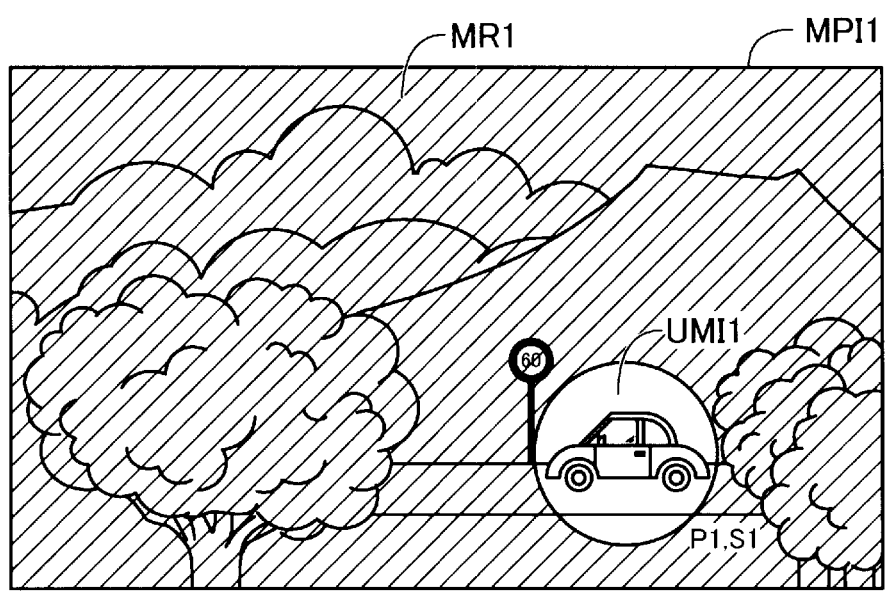
FIG. 12 is a diagram showing a first masking-processed image.

FIG. 12 is a diagram showing the first masking-processed image MPI1 stored in the masking-processed-image storing section 125 (FIG. 11). For convenience of illustration, a portion masked by the mask region MR1 is also drawn. In the second embodiment, the image synthesizing section 124a (FIG. 11) combines the input image INPI (FIG. 3) acquired from the input-image storing section 121 (FIG. 11) and the mask drawing image MDI1 (FIG. 4) acquired from the mask drawing circuit 123 and thereafter outputs an image signal of the generated first masking-processed image MPI1 to the masking-processed-image storing section 125.

Figure 13:
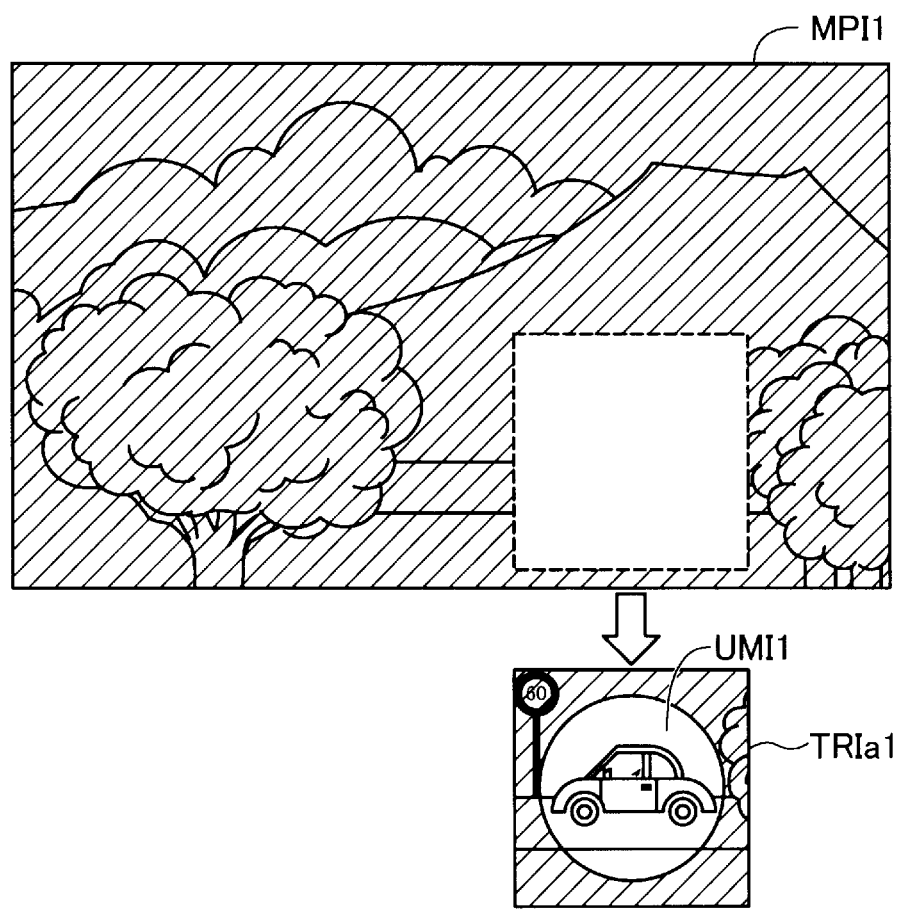
FIG. 13 is a diagram showing a state in which a trimming image is cut out.

FIG. 13 is a diagram showing a state in which the pixel conversion circuit 122a (FIG. 11) cuts out a trimming image TRIa1 including the non-mask image UMI1 from the first masking-processed image MPI1. The trimming image TRIa1 is a square image, the center of which coincides with the center of the non-mask image UMI1, larger than the non-mask image UMI1. Only a circular non-mask image UMI1 may be cut out as a trimming image. Coordinate values of pixels in the non-mask image UMI1 region included in the trimming image TRIa1 are indicated by coordinates $(x_n, y_n)$. The number of pixels in the trimming image TRIa1 region is indicated by the number of pixels M1.

Figure 14:
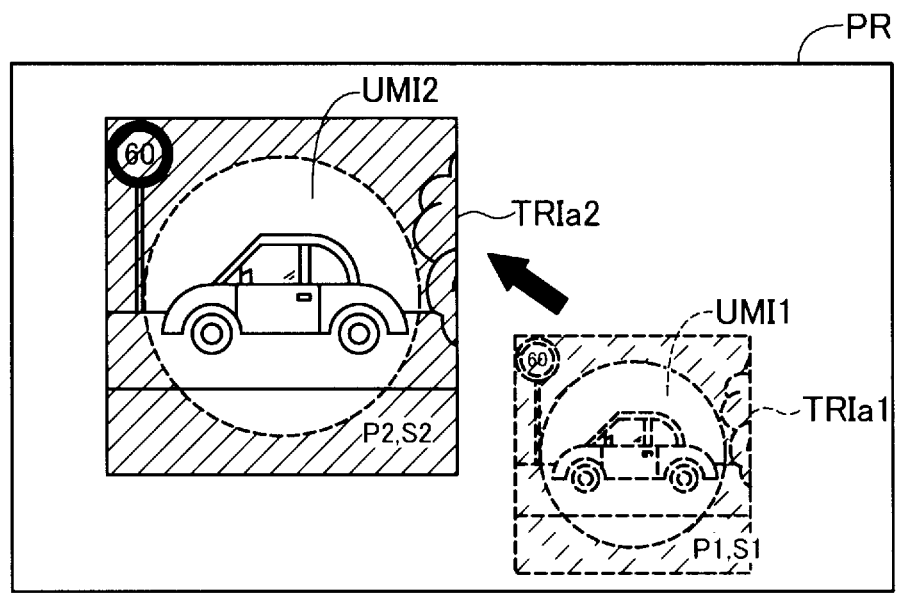
FIG. 14 is a diagram showing a state in which the trimming image is moved and enlarged.

FIG. 14 is a diagram showing a state in which the pixel conversion circuit 122a (FIG. 11) moves and enlarges the trimming image TRIa1 in the projection range PR. In the movement and the enlargement of the trimming image TRIa1, the number of pixels of the trimming image TRIa1 is increased to Q times the number of pixels M1. The pixel values of the pixels are interpolated. At the same time, the coordinate values of the pixels of the trimming image TRIa1 are changed to set the coordinate values of the pixels in the non-mask image UMI1 region included in the trimming image TRIa1 to coordinates of the second projecting position P2, that is, coordinates $(X_n, Y_n)$. Coordinate values of pixels in a trimming image TRIa2 region after the change are coordinates $(X_n, Y_n)$. As a result, it is possible to obtain the trimming image TRIa2 including the non-mask image UMI2 having the second dimension S2 located in the second projecting position P2.

Figure 15:
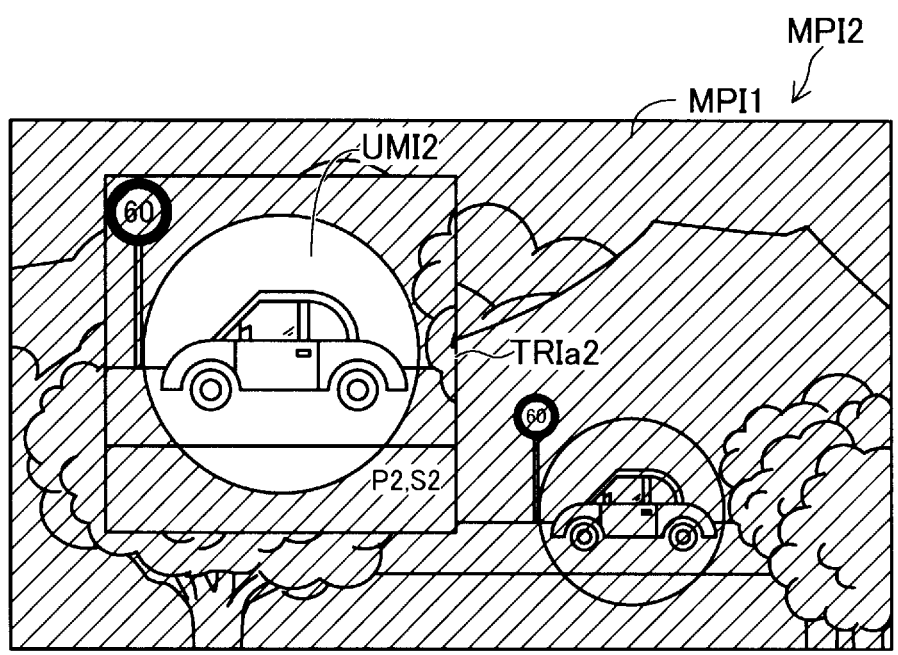
FIG. 15 is a diagram showing a state in which background processing is executed.

FIG. 15 is a diagram showing a state in which the image synthesizing section 124a (FIG. 11) combines the trimming image TRIa2 and the first masking-processed image MPI1 and executes the background processing on the first masking-processed image MPI1. In the combination of the trimming image TRIa2 and the first masking-processed image MPI1, the pixel values of the pixels of the coordinates $(X_m, Y_m)$ in the first masking-processed image MPI1 are converted into pixel values of the pixels in the trimming image TRIa2 region. Thereafter, the background processing is executed on a portion other than the trimming image TRIa2 of the first masked-processed image MPI1. Specifically, the luminance of an image of the portion other than the trimming image TRIa2 is set to "0". As a result, the second masking-processed image MPI2 is generated. When the non-mask image UMI1 is cut out as a trimming image, the moved and enlarged non-mask image UMI2 is combined with the first masking-processed image MPI1. The background processing is executed on the portion other than the non-mask image UMI2. The image synthesizing section 124a may combine the trimming image TRIa2 and all images (not shown in FIG. 15), pixel values of which are 0, instead of combining the trimming image TRIa2 and the first masking-processed image MPI1. In this case, the image synthesizing section 124a may not execute the background processing on the portion other than the trimming image TRIa2.

Figure 16:
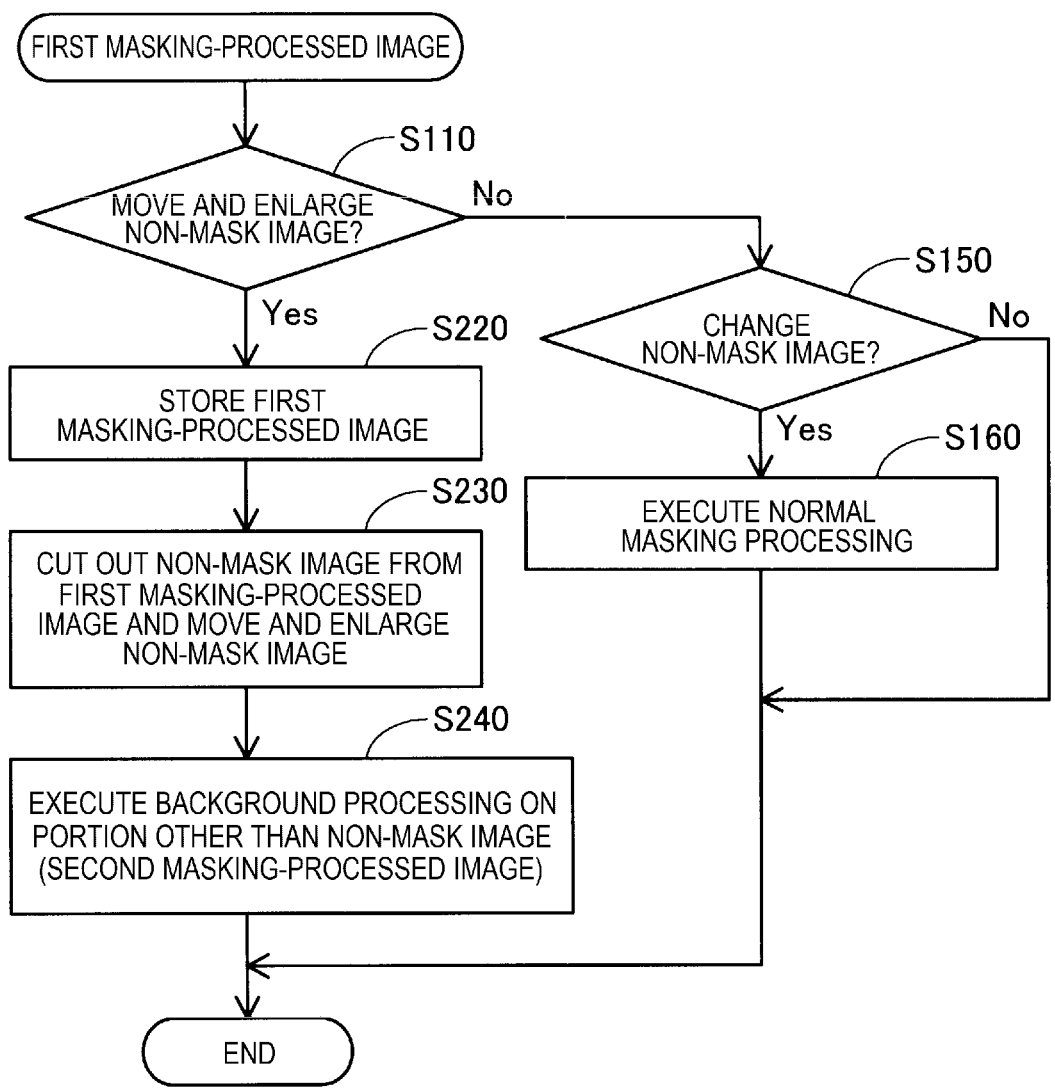
FIG. 16 is an example of a flowchart showing details of a masking processing process.

FIG. 16 is an example of a flowchart showing details of a masking processing process for the first masking-processed image MPI1 (FIG. 5) in the second embodiment and is a diagram corresponding to FIG. 10. In the flowchart shown in FIG. 16, steps S120 to S140 of the flowchart shown in FIG. 10 are replaced with steps S220 to S240.

In step S220, the image generating section 120a (FIG. 11) stores the first masking-processed image MPI1 according to control by the control section 130 (FIG. 12). In step S230, the image generating section 120a cuts out the trimming image TRIa1 including the non-mask image UMI1 from the first masking-processed image MPI1 according to the control by the control section 130 (FIG. 13). At the same time, the image generating section 120a moves the trimming image TRIa1 to move the non-mask image UMI1 from the first projecting position P1 to the second projecting position P2 and enlarges the trimming image TRIa1 to enlarge the non-mask image UMI1 from the first dimension S1 to the second dimension S2 to obtain the trimming image TRIa2 (FIG. 14). In step S240, the image generating section 120a combines the trimming image TRIa2 and the first masking-processed image MPI1 and executes the background processing on the portion other than the trimming image TRIa2 of the first masking-processed image MPI1 to obtain the second masking-processed image MPI2 according to the control by the control section 130 (FIG. 15).

As explained above, in the second embodiment, in order to generate the second masking-processed image MPI2, the image generating section 120a cuts out the trimming image TRIa1 including the non-mask image UMI1 from the first masking-processed image MPI1 and moves and enlarges the trimming image TRIa1 to move the non-mask image UMI1 from the first projecting position P1 to the second projecting position P2 and enlarge the non-mask image UMI1 from the first dimension S1 to the second dimension S2 to obtain the trimming image TRIa2. Thereafter, the image generating section 120a combines the trimming image TRIa2 and the first masking-processed image MPI1 and executes the background processing on the portion other than the trimming image TRIa2. Consequently, it is possible to prevent the position and the dimension of the non-mask region UMR1 from being changed to change content of the non-mask image UMI1.

The invention is not limited to the embodiments and can be realized in various configurations in a range not departing from the spirit of the invention. For example, the technical features in the embodiments corresponding to the technical features in the forms described in the summary can be substituted and combined as appropriate in order to solve a part or all of the problems described above or achieve apart of all of the effects described above. Unless the technical features are explained as essential technical features in this specification, the technical features can be deleted as appropriate.

What is claimed is:

1. A projecting apparatus configured to project a masking-processed image, the projecting apparatus comprising:
an image generating circuit configured to generate the masking-processed image by combining an input image and a mask drawing image including a mask region for masking the input image and a non-mask region for not masking the input image; and
a remote controller configured to accept a first operation, which represents an instruction for moving a non-mask image corresponding to the non-mask region from a first projecting position to a second projecting position, or a second operation, which represents an instruction for enlarging or reducing the non-mask image from a first dimension to a second dimension, from user, wherein the image generating circuit is configured to generate a first masking-processed image including a first non-mask image corresponding to the non-mask region in a first projecting position, and the image generating circuit is configured to
- move the non-mask region in the mask drawing image from the first projecting position to the second projecting position based on the first operation, cut out the first non-mask image in the first projecting position from the input image, generate a second non-mask image by moving the first non-mask image from the first projecting position to the second projecting position based on the first operation, and thereafter combine the second non-mask image and the mask drawing image to thereby generate the second masking-processed image, or
- enlarge or reduce the non-mask region in the mask drawing image from a first dimension to a second dimension based on the second operation, cut out the first non-mask image having the first dimension from the input image, generate a third non-mask image by enlarging or reducing the first non-mask image from the first dimension to the second dimension based on the second operation, and thereafter combine the third non-mask image and the mask drawing image to thereby generate the second masking-processed image.

2. The projecting apparatus according to claim 1, wherein the image generating circuit is configured to, based on the first operation, cut out the non-mask image in the first projecting position from the input image and move the non-mask image to the second projecting position, and thereafter combine the non-mask image and the mask drawing image to thereby generate the second masking-processed image.

3. The projecting apparatus according to claim 1, wherein the image generating circuit is configured to, based on the first operation, cut out, from the input image, a trimming image including the non-mask image in the first projecting position, and move the trimming image to move the non-mask image to the second projecting position, and thereafter combine the trimming image and the mask drawing image to thereby generate the second masking-processed image.

4. The projecting apparatus according to claim 1, wherein the image generating circuit is configured to, based on the second operation, cut out the non-mask image having the first dimension from the input image, enlarge or reduce the non-mask image at a same enlargement ratio or a same reduction ratio as an enlargement ratio or a reduction ratio of the non-mask region, and thereafter combine the non-mask image and the mask drawing image to thereby generate the second masking-processed image.

5. The projecting apparatus according to claim 1, wherein the image generating circuit is configured to, based on the second operation, cut out, from the input image, a trimming image including the non-mask image having the first dimension, enlarge or reduce the trimming image at a same enlargement ratio or a same reduction ratio as an enlargement ratio or a reduction ratio of the non-mask region, and thereafter combine the trimming image and the mask drawing image to thereby generate the second masking-processed image.

6. The projecting apparatus according to claim 1, wherein the image generating circuit is configured to, based on the first operation, cut out the non-mask image from the first masking-processed image including the non-mask image in the first projecting position, move the non-mask image to the second projecting position, and thereafter execute background processing on a portion other than the non-mask image of the first masking-processed image to thereby generate the second masking-processed image.

7. The projecting apparatus according to claim 1, wherein the image generating circuit is configured to, based on the first operation, cut out a trimming image including the non-mask image from the first masking-processed image including the non-mask image in the first projecting position, move the trimming image to move the non-mask image to the second projecting position, and thereafter execute background processing on a portion other than the non-mask image of the first masking-processed image to thereby generate the second masking-processed image.

8. The projecting apparatus according to claim 1, wherein the image generating circuit is configured to, based on the second operation, cut out the non-mask image from the first masking-processed image including the non-mask image having the first dimension, enlarge or reduce the non-mask image to the second dimension, and thereafter execute background processing on a portion other than the non-mask image of the first masking-processed image to thereby generate the second masking-processed image.

9. The projecting apparatus according to claim 1, wherein the image generating circuit is configured to, based on the second operation, cut out a trimming image including the non-mask image from the first masking-processed image including the non-mask image having the first dimension, enlarge or reduce the trimming image to change the non-mask image to the second dimension, and thereafter execute background processing on a portion other than the non-mask image of the first masking-processed image to thereby generate the second masking-processed image.

10. The projecting apparatus according to claim 1, wherein
- a setting menu projected by the projecting apparatus is configured to set the position and the dimension of the non-mask image, and
- the setting menu includes selections corresponding to the first operation and the second operation.

11. A projecting method comprising:
- executing a first operation, which represents an instruction for moving a non-mask image corresponding to a non-mask region from a first projecting position to a second projecting position, or a second operation, which represents an instruction for enlarging or reducing the non-mask image from a first dimension to a second dimension;
- executing image processing on a first masking-processed image generated by combining an input image and a mask drawing image including a mask region for masking the input image and the non-mask region for not masking the input image, the image processing including at least one of:
  - moving the non-mask region in the mask drawing image from the first projecting position to the second projecting position based on the first operation, cutting out a first non-mask image in the first projecting position from the input image, generating a second non-mask image by moving the first non-mask image from the first projecting position to the second projecting position based on the first operation, and thereafter combining the second non-mask image and the mask drawing image to thereby generate a second masking-processed image, and
  - enlarging or reducing the non-mask region in the mask drawing image from the first dimension to the second dimension based on the second operation, cutting out the first non-mask image having the first dimension from the input image, generating a third non-mask image by enlarging or reducing the first non-mask image from the first dimension to the second dimension based on the second operation, and thereafter combining the third non-mask image and the mask drawing image to thereby generate the second masking-processed image; and projecting the second masking-processed image.

12. The projecting method according to claim 11, further comprising, based on the first operation, cutting out the non-mask image in the first projecting position from the input image and moving the non-mask image to the second projecting position, and thereafter combining the non-mask image and the mask drawing image to thereby generate the second masking-processed image.

13. The projecting method according to claim 11, further comprising, based on the first operation, cutting out, from the input image, a trimming image including the non-mask image in the first projecting position, and moving the trimming image to move the non-mask image to the second projecting position, and thereafter combining the trimming image and the mask drawing image to thereby generate the second masking-processed image.

14. The projecting method according to claim 11, further comprising, based on the second operation, cutting out the non-mask image having the first dimension from the input image, enlarging or reducing the non-mask image at a same enlargement ratio or a same reduction ratio as an enlargement ratio or a reduction ratio of the non-mask region, and thereafter combining the non-mask image and the mask drawing image to thereby generate the second masking-processed image.

15. The projecting method according to claim 11, further comprising, based on the second operation, cutting out, from the input image, a trimming image including the non-mask image having the first dimension, enlarging or reducing the trimming image at a same enlargement ratio or a same reduction ratio as an enlargement ratio or a reduction ratio of the non-mask region, and thereafter combining the trimming image and the mask drawing image to thereby generate the second masking-processed image.

16. The projecting method according to claim 11, further comprising, based on the first operation, cutting out the non-mask image from the first masking-processed image including the non-mask image in the first projecting position, moving the non-mask image to the second projecting position, and thereafter executing background processing on a portion other than the non-mask image of the first masking-processed image to thereby generate the second masking-processed image.

17. The projecting method according to claim 11, further comprising, based on the first operation, cutting out a trimming image including the non-mask image from the first masking-processed image including the non-mask image in the first projecting position, moving the trimming image to move the non-mask image to the second projecting position, and thereafter executing background processing on a portion other than the non-mask image of the first masking-processed image to thereby generate the second masking-processed image.

18. The projecting method according to claim 11, further comprising, based on the second operation, cutting out the non-mask image from the first masking-processed image including the non-mask image having the first dimension, enlarging or reducing the non-mask image to the second dimension, and thereafter executing background processing on a portion other than the non-mask image of the first masking-processed image to thereby generate the second masking-processed image.

19. The projecting method according to claim 11, further comprising, based on the second operation, cutting out a trimming image including the non-mask image from the first masking-processed image including the non-mask image having the first dimension, enlarging or reducing the trimming image to change the non-mask image to the second dimension, and thereafter executing background processing on a portion other than the non-mask image of the first masking-processed image to thereby generate the second masking-processed image.

20. A projecting method comprising:
executing a first operation, which represents an instruction for moving a non-mask image corresponding to a non-mask region from a first projecting position to a second projecting position;
executing a second operation, which represents an instruction for enlarging or reducing the non-mask image from a first dimension to a second dimension;
generating a first masking-processed image by combining an input image and a mask drawing image including a mask region and a non-mask region, the first masking-processed image including a first non-mask image corresponding to the non-mask region in the first projecting position;
generating a second masking-processed image obtained by enlarging or reducing the non-mask image from the first dimension to a second dimension based on the second operation, cutting out the first non-mask image having the first dimension from the input image, generating a second non-mask image by enlarging or reducing the first non-mask image from the first dimension to the second dimension based on the second operation;
changing a position of the non-mask image in the second masking-processed image from the first projecting position to the second projecting position based on the first operation, generating a third non-mask image by moving the second non-mask image from the first projecting position to the second projecting position based on the first operation; and
projecting the second masking-processed image to the second projecting position.

* * * * *